United States Patent [19]

Bolle et al.

[11] Patent Number: 4,508,212

[45] Date of Patent: Apr. 2, 1985

[54] ADJUSTABLE TORQUE CONVEYOR ROLLER DRIVE

[75] Inventors: Fred Bolle, Pontiac; John R. Herronen, Linden; Joseph M. Wright, Fenton, all of Mich.

[73] Assignee: Tek-Matik, Inc., Howell, Mich.

[21] Appl. No.: 430,548

[22] Filed: Sep. 30, 1982

[51] Int. Cl.³ .......................................... B65G 13/06
[52] U.S. Cl. .................................. 198/781; 198/783; 464/48; 192/70.27; 192/89 R; 192/110 R
[58] Field of Search ...................... 198/781, 783, 789; 464/46, 48; 192/70.27, 70.25, 89 R, 89 B, 94, 97, 110 R, 111 B

[56] References Cited

U.S. PATENT DOCUMENTS

| | | | |
|---|---|---|---|
| 2,712,377 | 7/1955 | Eggleston | 198/781 X |
| 2,723,572 | 11/1955 | Bornzin | 464/48 X |
| 2,872,794 | 2/1959 | Slomer | 464/48 X |
| 2,953,911 | 9/1960 | Tigerman | 464/48 X |
| 3,038,576 | 6/1962 | Simpson | 464/48 X |
| 3,090,213 | 5/1963 | Lindgren | 464/48 |
| 3,729,088 | 4/1973 | Stein et al. | 198/857 X |
| 4,103,516 | 8/1978 | Marcin | 198/781 |
| 4,286,441 | 9/1981 | Scheneman et al. | 198/781 X |

FOREIGN PATENT DOCUMENTS

| | | | |
|---|---|---|---|
| 227981 | 1/1925 | United Kingdom | 464/48 |
| 1026657 | 4/1966 | United Kingdom | 198/781 |

Primary Examiner—Joseph E. Valenza
Assistant Examiner—Jonathan D. Holmes
Attorney, Agent, or Firm—Krass & Young

[57] ABSTRACT

A friction clutch for a conveyor roller bearing apparatus wherein a plurality of small thrust springs are disposed between an adjustable nut and a thrust pad to force a drive sprocket against a back-up friction pad connected to the roller axle shaft. Means such as sleeves around the springs or pins between the nut and thrust pad are provided to minimize or eliminate sideloading on the springs. The faces of the thrust and back-up pads are centrally relieved to concentrate the thrust forces in a band which corresponds with the radial locations of the thrust springs. By this arrangement a very uniform breakaway or release torque characteristic is provided about 360° of relative angular travel between the components.

10 Claims, 3 Drawing Figures

U.S. Patent    Apr. 2, 1985    4,508,212
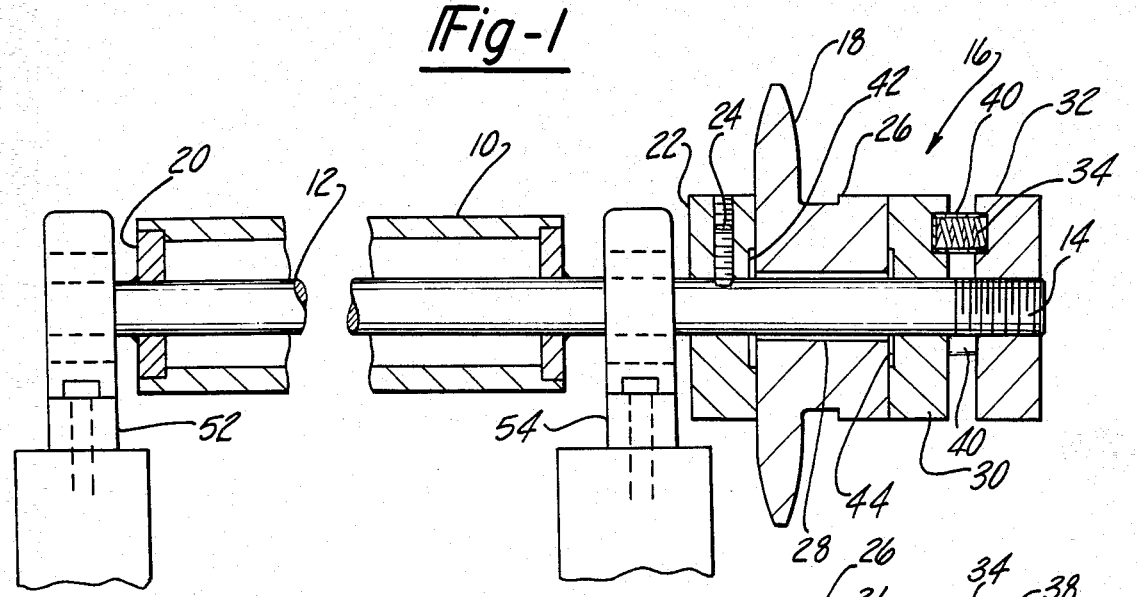
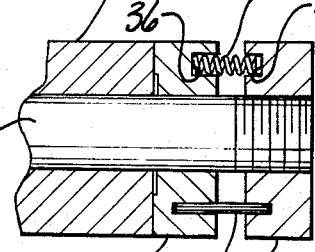
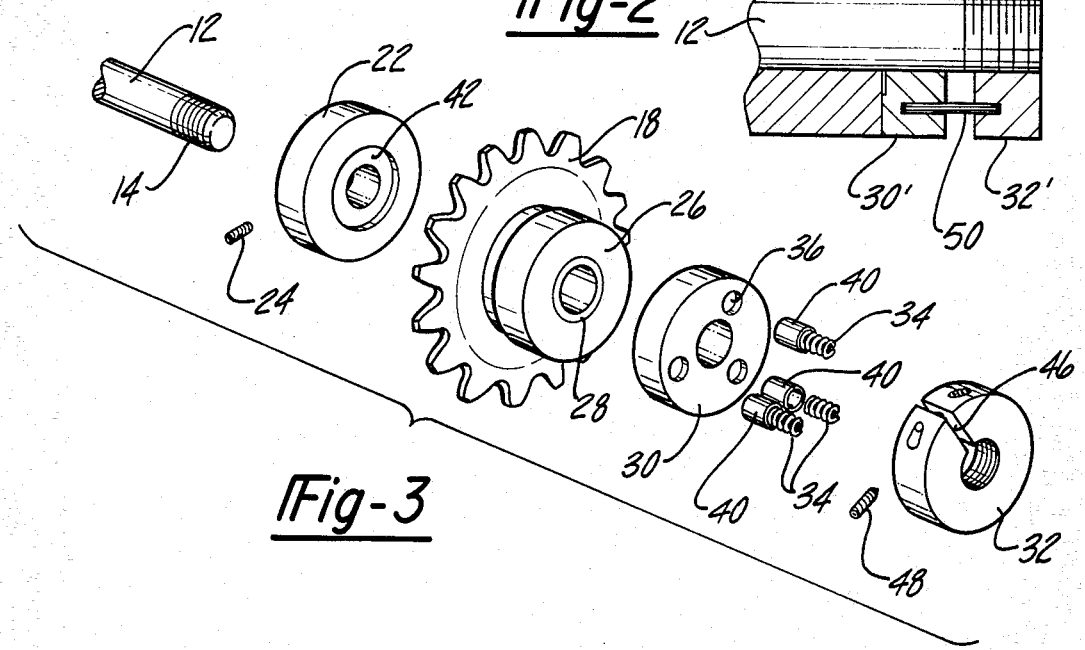

ABSOLUTE TORQUE CONVEYOR ROLLER DRIVE

DESCRIPTION

Introduction

This invention relates to roller conveyor apparatus and particularly to an improved friction clutch for roller conveyors.

BACKGROUND OF THE INVENTION

Roller conveyors are in common use for the conveyance of fabricated parts, trays, boxes and a variety of other items. In the case of an accumulator type conveyor, it is known to provide a friction clutch between the conveyor roller axle and a drive sprocket or wheel so that when the conveyed items back up and stop on the conveyor system, the conveyor roller or rollers immediately beneath the stalled item automatically stop rotating even though the conveyor drive continues to turn.

A friction clutch arrangement for a roller conveyor may, for example, comprise a shaft which forms the roller axle, a drive sprocket loosely mounted on the shaft so that the shaft may turn either with or independently of the roller, a back-up pad on one side of the sprocket, a thrust pad on the other side of the sprocket and means such as an adjustable nut for setting and maintaining the desired axial force level between the sprocket and the adjacent pads. Typically a large coil spring is coaxially disposed on the shaft between the nut and the thrust pad and the axial position of the nut, together with the compression strength of the spring, establishes the frictional coupling between the drive sprocket and the roller axle shaft via the pads. As long as the load imposes a reaction force or resistance within the load limits of the frictional coupling, the conveyor roller continues to turn. Whenever the load is stalled and imposes a greater resistance than can be transmitted through the friction coupling, the sprocket turns independently of the shaft and the conveyor roller stops rotating. For a given spring, the level at which the disengagement of the clutch occurs can be set by varying the axial position of the nut.

A problem which is typically encountered in the use of the above described friction clutch arrangement in a conveyor roller is a non-uniform thrust and/or frictional characteristic over a full 360° revolution of the drive sprocket relative to the adjacent pads. As a result the friction clutch may have non-uniform and unpredictable stall or disengagement levels; i.e., the roller under load may stop for 50 or 60 degrees of drive sprocket rotation and then begin rotating again. This appears to be due in part to the circumferentially non-uniform thrust characteristic produced by the prior art coil spring and by the difficulty in providing absolutely flat and frictionally uniform faces on the appropriate portions of the drive sprocket and the abutting pads.

BRIEF SUMMARY OF THE INVENTION

An objective of the present invention is to provide a friction clutch apparatus for a roller conveyor system which exhibits predictable and uniform thrust-friction characteristics, which is readily adjustable and which is simple and easy to manufacture and assemble. In general this is accomplished by the combination of a conveyor axle having a threaded end, a drive sprocket mounted on the axle for rotation both with and independently of the axle, a back-up pad on the inboard side of the axle and affixed to the axle shaft, a thrust pad on the other side of the sprocket, a nut threadedly mounted on the threaded end of the shaft and a plurality of small compression springs disposed axially between the nut and the thrust pad at radially outboard positions and in circumferentially uniform spacing so as to apply rotationally uniform and predictable thrust forces between the thrust pad and the drive sprocket, which thrust forces define the frictional coupling level between the drive sprocket and the conveyor roller shaft.

In the preferred form the friction clutch of the present invention comprises between about three and five compression springs between a nut and a thrust pad of a friction clutch for a roller conveyor apparatus, together with means for minimizing side loads or shear forces on the springs. This side load minimizing means may take several forms; for example, corresponding and facing sockets may be formed at the spring locations in the opposing faces of the nut and thrust pad to receive cups in surrounding relationship with the springs; alternatively, the nut and thrust pad may be pinned together by a plurality of axially extending pins so as to permit axial but not circumferential relative travel.

According to the most preferred form of the invention the faces of thrust pad and the back-up pad which abut the corresponding faces of the drive sprockets are centrally axially relieved or undercut such that the only surface portions which are in contact and which transmit axial frictional forces are those which are in substantially in radial alignment with the respective spring axes. In the typical case the axes of the springs are located on a common radius from the centerline of the conveyor axle shaft and the mean radius of the contact area lies on this axis.

BRIEF DESCRIPTION OF THE DRAWINGS

FIG. 1 is a side view, partly in section, of a roller conveyor embodying the invention;

FIG. 2 is a side view, partly in section, of a roller conveyor illustrating an alternative arrangement for eliminating side loads on the clutch springs; and FIG. 3 is an exploded view of the apparatus of FIG. 1.

DETAILED DESCRIPTION OF THE SPECIFIC EMBODIMENTS

Referring to FIG. 1 a polished cylindrical conveyor roller 10 is mounted on an axle shaft 12 having a threaded end 14. An adjustable friction clutch 16 is provided to couple a drive sprocket 18 to the shaft 12 so as to drive the roller 10. End caps 20 are welded to shaft 12 to secure the roller 10 to the shaft. Alternatively, a solid roller may be secured to the shaft by way of one or more set screws. Chain drive sprocket 18 with its integral annular boss portion 26 is mounted on shaft 12 by means of a bushing 28 so that the sprocket 18 may turn either with or independently of the shaft 12. Friction clutch 16 comprises a back-up pad 22 of low friction material fixed on the shaft 12 by means of a set screw and keyway arrangement 24. The outboard surface of back-up pad 22 contacts the inboard radial surface of sprocket 18 as shown. A thrust pad 30 is disposed on the opposite side of the sprocket 18 coaxially with the shaft 12 but is not directly pinned or otherwise directly secured to the shaft 12. The inboard radial surface of thrust pad 30 contacts the outboard radial surface of the boss 26 to provide a frictional engagement. A nut 32 is threaded onto the threaded end 14 of the shaft 12. A plurality of uniformly circumferentially spaced springs 34 are disposed between the nut 32 and the pad 30 to exert axially directed forces on the pad 30 according to the axial spacing between the nut 32 and the pad 30 and the strength of the springs 34. Recesses 36 are formed in the outboard face of the pad 30 and recesses 38 are formed in the inboard surface of the nut 32 at corresponding radii. Cups 40 are held in position between the opposing recesses and in surrounding relationship with the springs 34 to minimize or eliminate sideloads or shear forces which might otherwise distort or bend the springs 34 when the device is in operation. The cups 40 are of such axial length as to permit axial adjustment in the distances between nut 32 and pad 30 while remaining within the recesses 36 and 38. Axle shaft 12 is mounted on axially opposite bearings 52 and 54 for support.

It can be seen that by locating the springs 34 such that their respective centers are substantially radially outboard of the axial center of the friction clutch 16, uniform and equally distributed axial thrust forces on the pad 30 are provided. To enhance the uniformity of the thrust forces exerted by the pad 30 on the sprocket 18 and the reaction or resistive force exerted by pad 22 on sprocket 18, pad 22 is provided with an axially centralized and radially extending relief 42 and pad 30 is provided with a similar relief 44, the extent of both reliefs 42 and 44 being such that the mean radius of the contacting areas of pads 22 and 30 are coextensive with the common radius of the spring centers. This substantially reduces precision machining requirements and contributes to the uniformity of the friction-thrust characteristic about 360° of roller travel.

As best shown in FIG. 3 the nut 32 is split at 46 and provided with a screw 48 which permits the nut 32 to be fixed or clamped in any desired axial position on the threaded end 14 of shaft 12. Pads 22 and 30 are preferably made of a low friction material such as Oilite, brass impregnated with graphite or fiber impregnated with brass. Bushing 28 is preferably Oilite.

In operation the friction clutch 16 is assembled as shown and the nut 32, after loosening clamping screw 48, is advanced until the desired axial thrust forces is exerted by spring 34 on the pads 30 and, via pad 30, on the sprocket 18. The sprocket 18 is driven by a chain in conventional fashion to rotate the back-up pad 22, the shaft 12 and the fixed roller 10. As long as the load forces resisting rotation of roller 10 are below the level of torque transmitted from the sprocket 18 to the pad 22, the roller 10 continues to turn. However when the resistive load force exceeds the torque transmission capability of the clutch 16 the sprocket 18 turns freely on the shaft 12 and the shaft 12, pad 22 and roller 10 stop. The point at which this disengagement occurs is determined by the axial position of nut 32 and the compression force of the springs 34. Assuming springs 34 of known characteristic are used, a set of calibration markings between the end 14 and the shaft 12 and the nut 32 may be provided.

As shown in FIG. 2 an alternative structure for minimizing the sideloading or shear force effects on the springs 34 may be provided in smaller units; i.e., units where the radial dimensions are too small to afford adequate room for the sleeves 40. In these cases pins 50 are connected between the nut 32' and the thrust pad 30', such pins being set into and fixed to one of the members but extending displacably into sockets or cavities in the other member so as to afford clearance for the relative axial movement between the nut 32' and the pad 30'. The springs 34 are merely set in the socket 36 and 38. As a third alternative, not shown, the springs 34 may be mounted in surrounding relationship to the pins. However, the two illustrated arrangements are preferred.

Another significant advantage of the subject invention over the prior art single spring arrangement is the resulting uniformity of torque transfer characteristic in both forward and reverse directions of roller rotation. While specific constructions and materials are disclosed herein, it is to be understood that these are given by way of example and are not to be construed in a limiting sense.

We claim:

1. In a roller conveyor apparatus of the type including an axle shaft having a threaded end, a roller on the shaft and rotating therewith, a drive sprocket slidably mounted directly on the shaft and variably frictionally couplable to the shaft by way of a thrust pad and a back-up pad non-slidably mounted directly on the shaft and abutting axially opposite faces of the sprocket, and a nut threaded on the shaft end to control the frictional coupling between the sprocket and pads according to the axial position of the nut, the improvement which comprises:

a plurality of compression springs operatively disposed in uniformily circumferentially spaced relation axially between the nut and the adjacent thrust pad at a radially outwardly predetermined distance from the axis thereof to apply compression force to urge the thrust pad against the sprocket according to the axial position of the nut on the threaded shaft end.

2. Apparatus as defined in claim 1 further including means for maintaining the springs in position between the nut and the adjacent thrust pads.

3. Apparatus as defined in claim 2 wherein the maintaining means comprises recesses formed in the axially inboard face of the nut and the adjacent face of the thrust pad to receive and locate the spring ends.

4. Apparatus as defined in claim 3 further comprising cups disposed in the recesses and in coaxial surrounding relation with the springs.

5. Apparatus as defined in claim 1 further including a plurality of pins extending between and mounted in the opposing faces of the nut and adjacent thrust pad to minimize side loading of the springs due to relative rotation between the nut and adjacent thrust pad.

6. Apparatus as defined in claim 1 further including clamping means carried by the nut for locking the nut in a desired axial position on the threaded shaft end.

7. Apparatus as defined in claim 1 further including bushing means coaxial between the sprocket and the shaft.

8. Apparatus as defined in claim 1 wherein a full 360° axial relief is centrally formed in the face of the thrust pad over a portion of the radial dimension thereof so that only the radially outward portion thereof which is in substantial alignment with the springs engages the sprocket.

9. Apparatus as defined in claim 8 wherein the face of the back-up pad which contacts the sprocket is centrally axially relieved to at least approximately the same radial extent as the thrust pad.

10. Apparatus as defined in claim 9 wherein the pads are made of a low friction material.

* * * * *